US010730686B2

(12) United States Patent
Wright et al.

(10) Patent No.: US 10,730,686 B2
(45) Date of Patent: *Aug. 4, 2020

(54) CANDY DISPENSER

(71) Applicant: My Favorite Company, Inc., Los Angeles, CA (US)

(72) Inventors: Neil Wright, Los Angeles, CA (US); Mark Eisenberg, Los Angeles, CA (US)

(73) Assignee: My Favorite Company, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/565,010

(22) Filed: Sep. 9, 2019

(65) Prior Publication Data

US 2019/0389647 A1 Dec. 26, 2019

Related U.S. Application Data

(63) Continuation of application No. 15/673,136, filed on Aug. 9, 2017, now Pat. No. 10,407,235.

(Continued)

(51) Int. Cl.
*G07F 11/22* (2006.01)
*B65D 83/04* (2006.01)
(Continued)

(52) U.S. Cl.
CPC ......... *B65D 83/0418* (2013.01); *A23G 3/50* (2013.01); *B65D 81/365* (2013.01);
(Continued)

(58) Field of Classification Search
CPC .. B65D 81/365; B65D 83/0409; B65D 85/60; B65D 83/0418; B65D 2583/0486;
(Continued)

(56) References Cited

U.S. PATENT DOCUMENTS 4,311,251 A * 1/1982 Sternberg ........... B65D 83/0418
221/229
4,978,030 A 12/1990 Morris et al.
(Continued)

FOREIGN PATENT DOCUMENTS

CN 102791593 A 11/2012
CN 202784376 U 3/2013
EP 0233298 A1 8/1987

OTHER PUBLICATIONS

Handmade Wooden push button Candy Dispenser by WildWoodCarver http://www.pinterest.com/74802043786115084/ 2 pages.

(Continued)

*Primary Examiner* — Gene O Crawford
*Assistant Examiner* — Ayodeji T Ojofeitimi
(74) *Attorney, Agent, or Firm* — Miller, Matthias & Hull LLP

(57) ABSTRACT

A confectionary item dispenser include a dispenser housing having a dispenser housing opening, a reservoir within the dispenser housing having a reservoir chute aligned with the dispenser housing opening, and a dispenser shield disposed within the dispenser housing and movable so that a dispenser shield opening can align with the dispenser housing opening and the reservoir chute at a dispensing position to dispense a confectionary item. An indeterminate outcome actuation mechanism with an actuation mechanism input device causes the dispenser shield to move between the dispensing position and a non-dispensing position when the actuation mechanism input device is displaced such that the dispenser shield may be disposed in one of the dispensing position and the non-dispensing position when the actuation mechanism input device is displaced so that a confectionary item may or may not be dispensed each time.

20 Claims, 7 Drawing Sheets

Related U.S. Application Data

(60) Provisional application No. 62/428,121, filed on Nov. 30, 2016.

(51) Int. Cl.
    *B65D 81/36*     (2006.01)
    *B65D 85/60*     (2006.01)
    *G07F 11/44*     (2006.01)
    *A23G 3/50*     (2006.01)

(52) U.S. Cl.
    CPC ......... *B65D 83/0409* (2013.01); *B65D 85/60* (2013.01); *G07F 11/22* (2013.01); *G07F 11/44* (2013.01); *B65D 2583/0477* (2013.01); *B65D 2583/0486* (2013.01)

(58) Field of Classification Search
    CPC . B65D 2583/0477; G07F 11/44; G07F 11/22; A23G 3/50
    See application file for complete search history.

(56) References Cited

U.S. PATENT DOCUMENTS

| | | | |
|---|---|---|---|
| 5,048,720 A * | 9/1991 | Hoke ................ | B65D 83/0418 221/198 |
| 5,318,469 A * | 6/1994 | Unalp .................... | A63H 3/003 221/24 |
| 5,324,527 A | 6/1994 | Coleman | |
| 5,356,035 A * | 10/1994 | Shlopak ............... | B65D 47/265 222/498 |
| 5,673,813 A | 10/1997 | Russell | |
| 5,690,535 A | 11/1997 | Coleman et al. | |
| 5,902,169 A | 5/1999 | Yamakawa | |
| 5,913,453 A | 6/1999 | Coleman et al. | |
| 6,039,213 A * | 3/2000 | Sloan ................... | B65D 47/243 222/192 |
| 6,074,266 A | 6/2000 | Zak | |
| 6,099,873 A | 8/2000 | Coleman et al. | |
| 6,129,608 A * | 10/2000 | Prichard .................. | A23G 3/34 221/186 |
| 6,244,463 B1 * | 6/2001 | Richards .................. | A23G 3/50 221/24 |
| 6,267,639 B1 * | 7/2001 | Menow .................... | A63H 5/00 221/152 |
| 6,299,015 B1 | 10/2001 | Hasan et al. | |
| 6,401,970 B1 * | 6/2002 | Harris ...................... | A63H 1/16 221/24 |
| 6,499,625 B1 * | 12/2002 | Mendillo .................. | A47F 1/04 221/202 |
| 6,530,499 B1 | 4/2003 | Coleman et al. | |
| 6,543,639 B1 * | 4/2003 | Kovens ............... | B65D 83/0418 221/217 |
| 6,595,385 B2 | 7/2003 | Nakamoto et al. | |
| 6,644,497 B1 * | 11/2003 | Klundt ................... | A63H 3/005 221/24 |
| 6,645,030 B2 | 11/2003 | Coleman et al. | |
| 6,966,451 B2 | 11/2005 | Weiss et al. | |
| 8,524,300 B1 | 9/2013 | Diamond et al. | |
| 8,608,024 B2 | 12/2013 | Giraud et al. | |
| 9,039,988 B2 * | 5/2015 | King .................... | B01F 5/0496 134/84 |
| 9,126,742 B2 | 9/2015 | Elliott et al. | |
| 9,499,306 B2 | 11/2016 | Miller et al. | |
| 10,407,235 B2 * | 9/2019 | Wright ............... | B65D 83/0418 |
| 2002/0038806 A1 * | 4/2002 | Senda ................ | B65D 83/0418 221/209 |
| 2002/0108961 A1 * | 8/2002 | Nakamoto ............. | A63H 33/00 221/24 |
| 2003/0215549 A1 | 11/2003 | Coleman et al. | |
| 2004/0016763 A1 * | 1/2004 | Hilliard .............. | B65D 83/0454 221/79 |
| 2004/0065671 A1 * | 4/2004 | Suda ................... | B65D 83/0418 221/249 |
| 2004/0195260 A1 * | 10/2004 | Suda ................. | B65D 83/0409 221/210 |
| 2005/0000979 A1 * | 1/2005 | Loshkajian ........... | A47F 5/0884 221/282 |
| 2005/0035132 A1 * | 2/2005 | Weiss ................... | B65D 81/366 221/24 |
| 2005/0098576 A1 | 5/2005 | Fenton et al. | |
| 2005/0258182 A1 * | 11/2005 | Anderson ......... | A61M 15/0045 221/7 |
| 2006/0134277 A1 * | 6/2006 | Packard .................... | B44C 5/00 426/115 |
| 2007/0125794 A1 * | 6/2007 | Jones ...................... | G07F 11/14 221/231 |
| 2008/0230556 A1 * | 9/2008 | Kroupa .................. | B65D 25/22 221/256 |
| 2009/0241247 A1 * | 10/2009 | Thurin .................... | E03D 9/005 4/223 |
| 2010/0065577 A1 * | 3/2010 | Coughlin ................ | G07F 11/24 221/277 |
| 2010/0258583 A1 * | 10/2010 | Schick .................. | A61J 7/0076 221/279 |
| 2011/0060457 A1 * | 3/2011 | De Vrught ................. | A61J 1/03 700/241 |
| 2011/0253737 A1 * | 10/2011 | Portney .............. | B65D 83/0454 221/277 |
| 2012/0312834 A1 * | 12/2012 | Elliott ................ | B65D 83/0409 221/1 |
| 2013/0203789 A1 | 8/2013 | Wyckoff et al. | |
| 2013/0206786 A1 * | 8/2013 | Diamond ........... | B65D 83/0409 221/24 |
| 2013/0292406 A1 * | 11/2013 | Kim .................... | B65D 83/0409 221/277 |
| 2015/0076170 A1 * | 3/2015 | Goettke ............. | B65D 83/0409 221/250 |
| 2015/0210434 A1 * | 7/2015 | Miller .................... | B65D 31/12 383/40 |
| 2017/0216733 A1 * | 8/2017 | Williams ................ | A63H 3/005 |
| 2019/0092557 A1 * | 3/2019 | Li .......................... | B65D 83/04 |

OTHER PUBLICATIONS

Motion Activated Candy Machine, http://www.gadgetreview.com/motioin-activated-candy-machine 9 pages.

Personalized Executive Candy Dispenser, http://www.personalizationmall.com/Personalized-Candy-Dispenser-for-Executived-p13159.prod?sdest=Search&sdestid=62503591 3 Pages.

\* cited by examiner

CANDY DISPENSER

CROSS-REFERENCE TO RELATED APPLICATION

This application is a continuation of U.S. patent application Ser. No. 15/673,136, filed on Aug. 9, 2017, which claims priority to U.S. Provisional Patent Application Ser. No. 62/428,121, filed on Nov. 30, 2016, which applications are expressly incorporated by reference herein.

TECHNICAL FIELD

The present disclosure relates generally to candy dispensers and, more particularly, to a candy dispenser having an indeterminate outcome actuation mechanism.

BACKGROUND

Various candy dispensing devices have been designed and marketed to provide entertaining ways of storing and dispensing confectionary items, such as pieces of candy. For example, U.S. Pat. No. 6,129,609 issued to Prichard et al. on Oct. 10, 2000, entitled "Candy Dispensing Character" discloses a candy dispensing character with a candy dispensing body, a hollow candy reservoir disposed in the candy dispensing body and sized to hold a plurality of candy pieces, a movable candy dispensing bin attached to the candy dispensing body and being movable between a closed position and an open position in which a portion of the candy dispensing bin extends outwardly from the candy dispensing body so that a piece of candy may be removed from the candy dispensing bin. The candy dispensing character is also provided with a biasing mechanism that causes the candy dispensing bin to be biased towards the closed position and a support, such as a pair of legs, coupled to the candy dispensing body that is shaped so as to be capable of supporting the candy dispensing body in a standing position. The support is operatively coupled to the candy dispensing bin so that movement of the support relative to the candy dispensing body causes the candy dispensing bin to move from the closed position to the open position.

U.S. Pat. No. 6,244,463 issued to Richards et al. on Jun. 12, 2001, entitled "Candy Dispenser with Single-User-Action Dispensing Mechanism" discloses a candy dispenser in the form of a toy spacecraft having a single user action dispensing mechanism. The candy dispenser may include an internal cavity to store candies. The internal cavity may be provided in the form of a cockpit for the spacecraft, with a cockpit windshield serving as a lid to retain candies therein. The dispensing mechanism may include a user-depressable button in the form of a passenger of the spacecraft, which upon a single depression, both loads a candy into a firing chamber, and fires the candy from the spacecraft. After each depression of the passenger button, the button is automatically reset to facilitate ease of use and rapid firing. These examples are typical of many dispensers that dispense a confectionary item each time a dispensing mechanism is actuated.

SUMMARY OF THE DISCLOSURE

In one aspect of the present disclosure, a confectionary item dispenser is disclosed. The confectionary item dispensary may include a dispenser housing having a dispenser housing opening, a reservoir for holding confectionary items disposed within the dispenser housing and having a reservoir chute aligned with the dispenser housing opening, and a dispenser shield disposed between the dispenser housing and the reservoir. The dispenser shield may have a dispenser shield wall with a dispenser shield opening there through, wherein the dispenser shield is movable between a dispensing position where the dispenser shield opening is aligned with the dispenser housing opening and the reservoir chute so that a confectionary item disposed within the reservoir chute can be dispensed through the dispenser shield opening and the dispenser housing opening, and a non-dispensing position where the reservoir chute is covered by the dispenser shield wall to retain the confectionary item within the reservoir chute. The confectionary item dispensary may further include an indeterminate outcome actuation mechanism disposed within the dispenser housing and operatively connected to the dispenser shield. The indeterminate outcome actuation mechanism may comprise an actuation mechanism input device engageable by a user of the confectionary item dispenser, wherein the indeterminate outcome actuation mechanism engages the dispenser shield to cause the dispenser shield to move between the dispensing position and the non-dispensing position when the actuation mechanism input device is displaced from an input device normal position toward an input device actuation position so that the dispenser shield may be disposed in either one of the dispensing position and the non-dispensing position when the actuation mechanism input device is displaced back to the input device normal position.

In another aspect of the present disclosure, an indeterminate outcome actuation mechanism for a confectionary item dispenser is disclosed. The confectionary item dispenser may have a dispenser housing with a dispenser housing opening, a reservoir disposed within the dispenser housing and having a reservoir chute aligned with the dispenser housing opening, and a dispenser shield between the dispenser housing and the reservoir, the dispenser shield having a dispenser shield wall with a dispenser shield opening there through, and being movable between a dispensing position where the dispenser shield opening is aligned with the dispenser housing opening and the reservoir chute and a non-dispensing position where the reservoir chute is covered by the dispenser shield wall. The indeterminate outcome actuation mechanism may include an actuation mechanism input device engageable by a user of the confectionary item dispenser and having an input device normal position and an input device actuation position, and a dispenser shield drive member engaging the dispenser shield when the actuation mechanism input device is displaced from the input device normal position toward the input device actuation position to cause the dispenser shield to move between the dispensing position and the non-dispensing position. The dispenser shield drive member may allow the dispenser shield to move each instance of the actuation mechanism input device being displaced from the input device normal position to the input device actuation position so that the dispenser shield may be disposed in either one of the dispensing position and the non-dispensing position when the actuation mechanism input device is displaced back to the input device normal position.

In a further aspect of the present disclosure, a confectionary item dispenser is disclosed. The confectionary item dispenser may include a dispenser housing having a dispenser housing opening, a reservoir for holding confectionary items disposed within the dispenser housing and having a reservoir chute aligned with the dispenser housing opening, and a dispenser shield disposed between the dispenser housing and the reservoir. The dispenser shield may have a dispenser shield wall with a dispenser shield opening there through, wherein the dispenser shield is movable between a dispensing position where the dispenser shield opening is aligned with the dispenser housing opening and the reservoir chute so that a confectionary item disposed within the reservoir chute can be dispensed through the dispenser shield opening and the dispenser housing opening, and a non-dispensing position where the reservoir chute is covered by the dispenser shield wall to retain the confectionary item within the reservoir chute. The confectionary item dispenser may further include an indeterminate outcome actuation mechanism disposed within the dispenser housing and operatively connected to the dispenser shield. The indeterminate outcome actuation mechanism comprising an actuation mechanism input device engageable by a user of the confectionary item dispenser, wherein the indeterminate outcome actuation mechanism engages the dispenser shield to cause the dispenser shield to move between the dispensing position and the non-dispensing position when the actuation mechanism input device is displaced from an input device normal position toward an input device actuation position so that the dispenser shield may be disposed in either one of the dispensing position and the non-dispensing position when the actuation mechanism input device is displaced back to the input device normal position. The confectionary item dispenser may also include an upper lock arm operatively connected to the actuation mechanism input device, and a lower lock arm operatively connected to the actuation mechanism input device, wherein the upper lock arm extends to prevent the confectionary items from entering the reservoir chute and the lower lock arm retracts to allow the confectionary item in the reservoir chute to be dispensed from the reservoir chute when the actuation mechanism input device is in the input device normal position, and wherein the upper lock arm retracts to allow the confectionary items to enter the reservoir chute and the lower lock arm extends into the reservoir chute to prevent the confectionary item therein from dispensing when the actuation mechanism input device is displaced toward the input device actuation position.

Additional aspects are defined by the claims of this patent.

DETAILED DESCRIPTION

Figure 1:
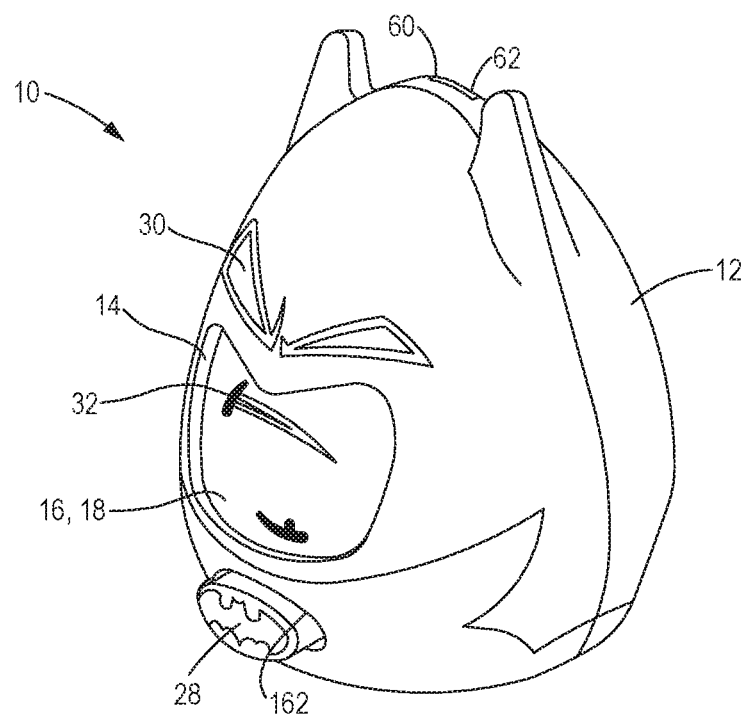
FIG. 1 is an isometric view of a candy dispenser with an indeterminate outcome actuation mechanism in accordance with the present disclosure with a dispenser shield in a non-dispensing position.
Figure 2:
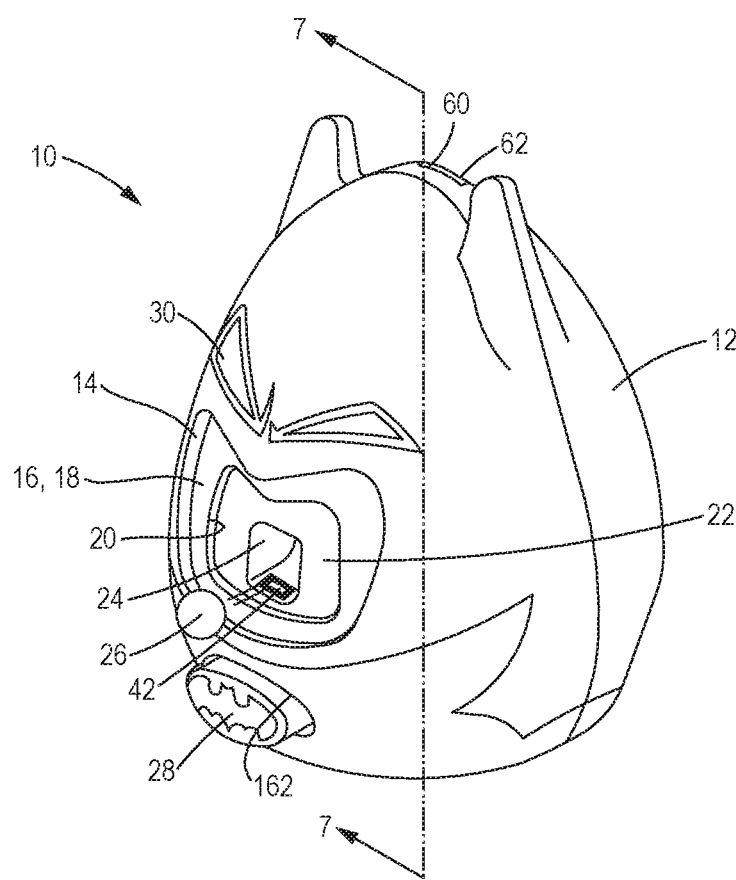
FIG. 2 is an isometric view of candy dispenser of FIG. 1 with the dispenser shield in a dispensing position.

FIGS. 1 and 2 illustrate an exemplary embodiment of a candy dispenser 10 in accordance with the present disclosure having an indeterminate outcome as to whether candy will be dispensed when the candy dispenser 10 is actuated. The candy dispenser 10 has a dispenser housing 12 with a dispenser housing opening 14. The dispenser housing 12 may be shaped to match features of a person, an animal, a cartoon, movie or literary character, or the like. In the illustrated embodiment, the candy dispenser 10 is shaped to suggest the comic book character Batman™, but other configurations are contemplated.

The candy dispenser 10 further includes a dispenser shield 16 disposed within the dispenser housing 12. The dispenser shield 16 has a dispenser shield wall 18 that may overlay the dispenser housing opening 14 in a non-dispensing position as shown in FIG. 1 to separate the interior of the dispenser housing 12 from the exterior and prevent the dispensing of candy stored therein. The dispenser shield 16 may be rotatable within the dispenser housing 12 to a dispensing position where a dispenser shield opening 20 (FIG. 2) is aligned with the dispenser housing opening 14 to expose the interior of the dispenser housing 12. While the dispensing shield 16 is rotatable in the present embodiment, the dispensing shield 16 may move through other paths of motion in alternative embodiments while still being indeterminate as to whether the dispensing shield will stop at the dispensing or the non-dispensing positions.

A candy reservoir 22 is disposed within the dispenser housing 12, with the dispenser shield wall 18 being positioned between the dispenser housing 12 and the candy reservoir 22. The candy reservoir 22 may include a candy reservoir chute 24 that is aligned with the dispenser housing opening 14 to provide a path from the candy reservoir 22 to the dispenser housing opening 14 for dispensing a confectionary item such as a candy piece 26 when the dispenser shield 16 is in the dispensing position of FIG. 2. In the non-dispensing position of FIG. 1, the candy reservoir chute 24 is covered by the dispenser shield wall 18 to retain the candy piece 26 within the candy reservoir chute 24. Actuation of the candy dispenser 10 and movement of the dispenser shield 16 are controlled in a manner discussed more fully below by an indeterminate outcome actuation mechanism having an actuation mechanism input device such as an actuation button 28 that extends outward from the dispenser housing 12.

The dispenser shield 16 of the candy dispenser 10 may have one or more non-dispensing positions where the dispenser shield wall 18 covers the candy reservoir chute 24, and one or more dispensing positions where the dispenser shield opening or openings 20 align with the candy reservoir chute 24 and the dispenser housing opening 14. In the embodiment illustrated and described herein, the dispenser shield 16 has three discrete non-dispensing positions and one dispensing position with one dispenser shield opening 20. However, other combinations of non-dispensing and dispensing positions are contemplated.

Figure 3:
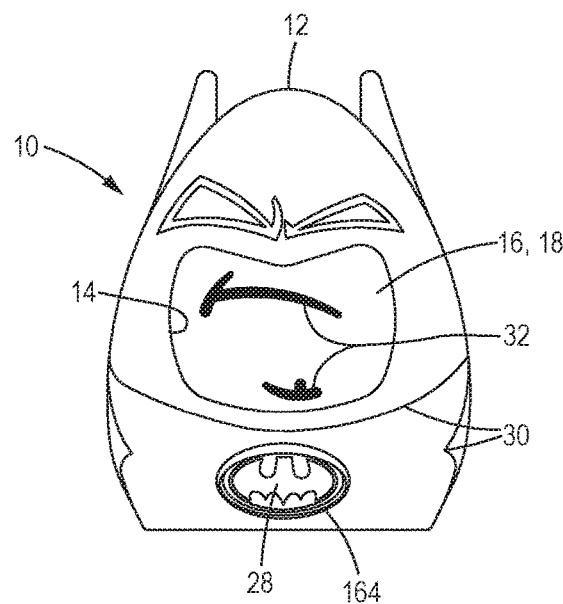
FIG. 3 is a front view of candy dispenser of FIG. 1 with the dispenser shield in a first non-dispensing position
Figure 4:
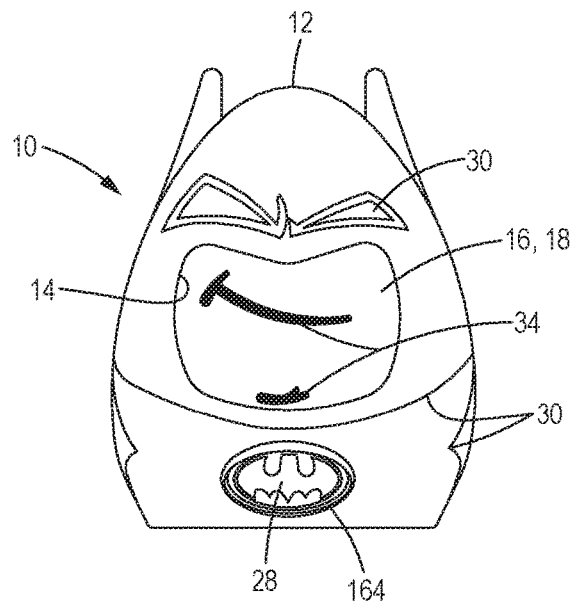
FIG. 4 is a front view of candy dispenser of FIG. 1 with the dispenser shield in a second non-dispensing position
Figure 5:
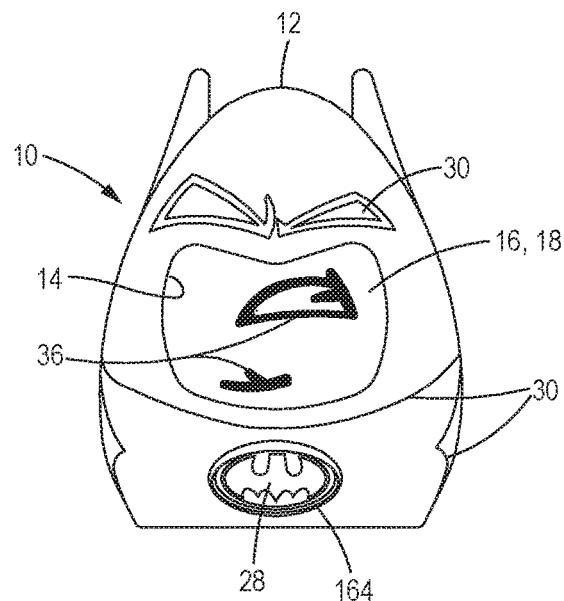
FIG. 5 is a front view of candy dispenser of FIG. 1 with the dispenser shield in a third non-dispensing position

FIGS. 3-5 illustrate the candy dispenser 10 with the dispenser shield 16 at each of the three non-dispensing positions. Referring to FIG. 3, the dispenser housing 12 has character facial indicia 30 on the exterior surface to further define features of the character. As illustrated, the character facial indicia 30 include outlines of a cowl worn by the character, and eye openings formed in the cowl for the character's eyes. The character is further developed by forming the dispenser housing opening 14 in the shape of a mouth opening in the cowl.

The dispenser shield 16 can be configured to further develop the character and to identify the distinct non-dispensing positions. For example, in FIG. 3, the dispenser shield 16 has first character expression indicia 32 on the dispenser shield wall 18 that aligns with the dispenser housing opening 14 when the dispenser shield 16 is in a first non-dispensing position. The first character expression indicia 32 may depict a mouth and chin shaped to suggest that the character is frowning. Second character expression indicia 34 on the dispenser shield wall 18 suggesting a wry smile aligns with the dispenser housing opening 14 when the dispenser shield 16 is in the second non-dispensing position shown in FIG. 4. Finally, third character expression indicia 36 suggesting anger aligns with the dispenser housing opening 14 when the dispenser shield 16 is in the third non-dispensing position of FIG. 5.

Figure 6:
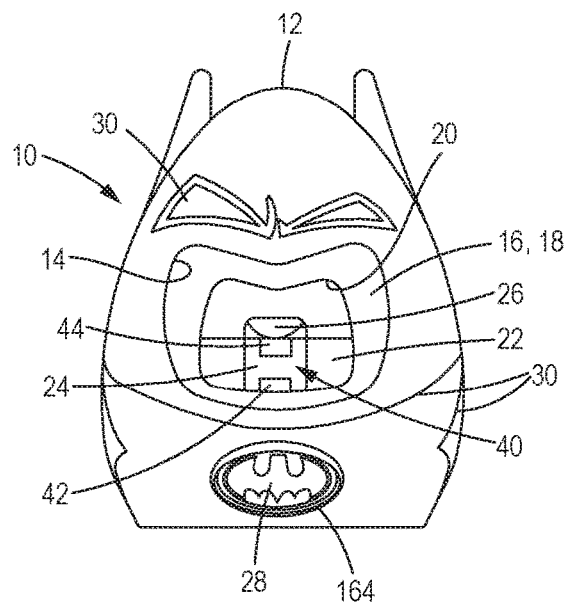
FIG. 6 is a front view of candy dispenser of FIG. 1 with the dispenser shield in a dispensing position.

As discussed previously, the dispenser shield opening 20 aligns with the dispenser housing opening 14 and the candy reservoir chute 24 when the dispenser shield 16 is in the dispensing position as shown in FIG. 6. FIG. 6 further illustrates elements of a reservoir locking mechanism 40 of the candy dispenser 10 that controls a flow of candy pieces 26 from the candy reservoir 22 through the candy reservoir chute 24 for dispensing when the dispenser shield 16 is in the dispensing position. The reservoir locking mechanism 40 may include, among other elements, a lower lock arm 42 disposed proximate the dispenser housing opening 14 and an upper lock arm 44 disposed proximate an inward upper end of the candy reservoir chute 24. Additional elements and the functioning of the reservoir locking mechanism 40 are described in greater detail hereinafter.

Figure 7:
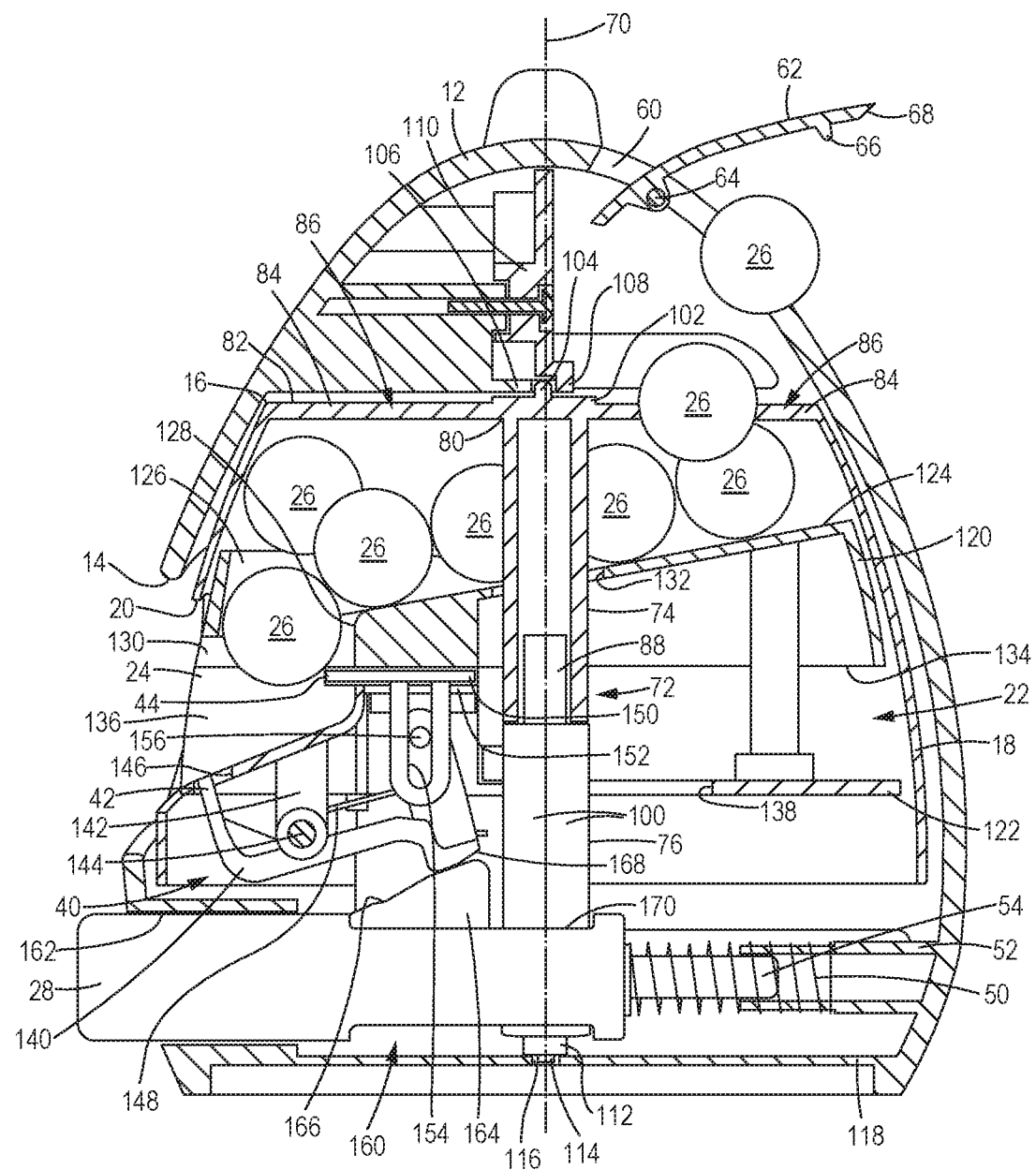
FIG. 7 is a side cross-sectional view of the candy dispenser of FIG. 1 taken through line 7-7 of FIG. 2 with the indeterminate outcome actuation mechanism in an input device normal position and the dispenser shield in the dispensing position.

FIG. 7 is a partial cross-sectional view of the candy dispenser 10 with the dispenser housing 12, the dispenser shield 16 and the candy reservoir 22 shown in cross-section. Other elements are not shown in cross-section for clarity of illustration and discussion. The dispenser shield 16 is in the dispensing position and the dispenser shield opening 20 is aligned with the dispenser housing opening 14 and the candy reservoir chute 24. The actuation button 28 as shown is biased to an input device normal position by an actuation button spring 50 disposed between the actuation button 28 and an actuation button guide sleeve 52 extending inward from the dispenser housing 12. The actuation button guide sleeve 52 receives an actuation button guide shaft 54 to guide the actuation button 28 when a user of the candy dispenser 10 displaces the actuation button 28 between the input device normal position and an input device actuation position that is illustrated and described further below. In the input device normal position, the indeterminate outcome actuation mechanism engages the dispenser shield 16 to secure the dispenser shield 16 in position.

Figure 8:
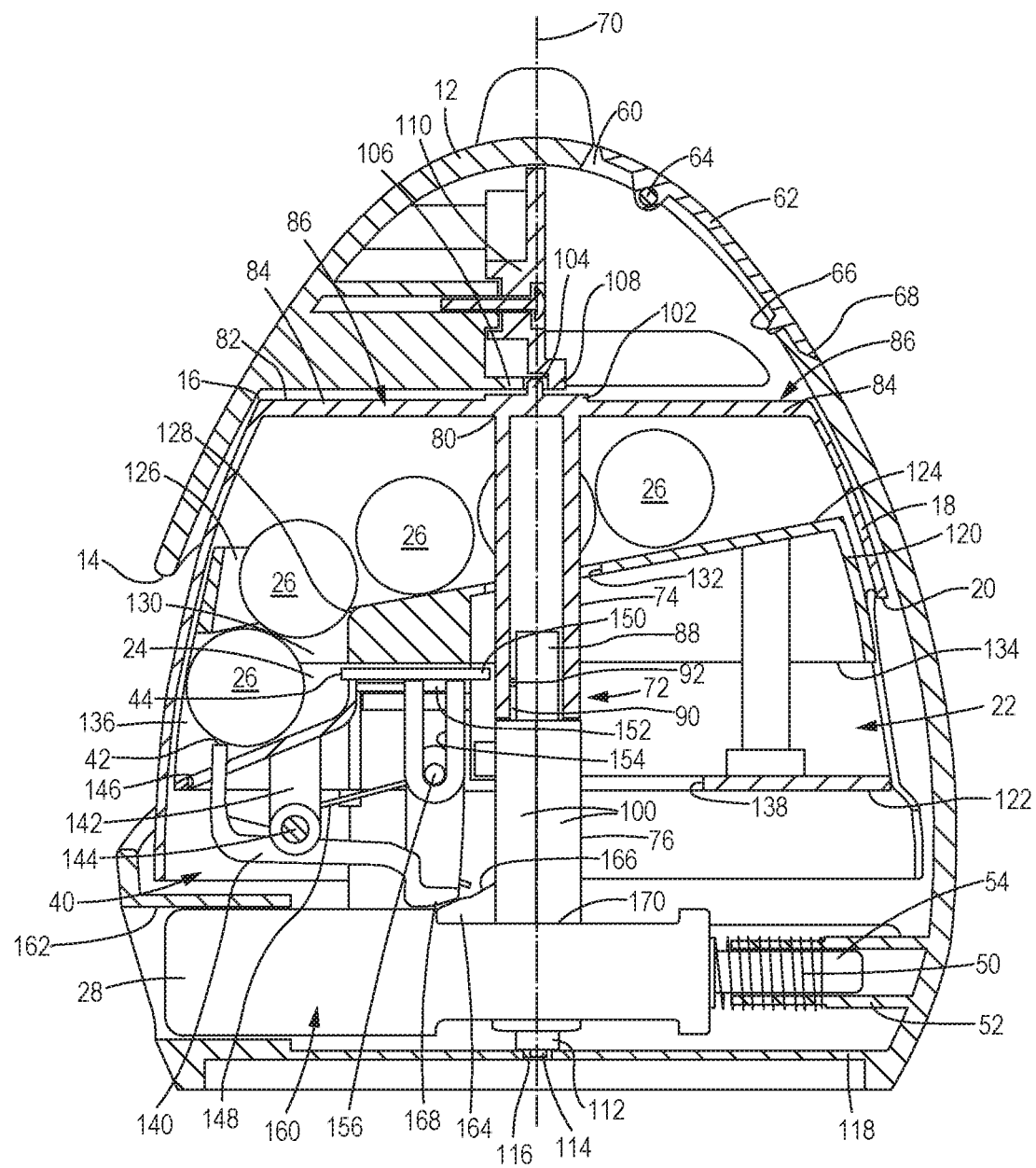
FIG. 8 is the side cross-sectional view of the candy dispenser of FIG. 7 with the indeterminate outcome actuation mechanism in an input device actuation position and the dispenser shield in the second non-dispensing position.

Candy pieces 26 may be added to the candy dispenser 10 via a candy fill opening 60 through the dispenser housing 12. The candy fill opening 60 may be covered by a candy fill door 62 movably connected to the dispenser housing 12 to move between a candy fill door open position as shown and a candy fill door closed position (FIG. 8). The candy fill door 62 may be pivotally connected to the dispenser housing 12 by a fill door pivot shaft 64. The candy fill door 62 may have a fill door detent 66 that engages the dispenser housing 12 to lock the candy fill door 62 in the fill door closed position. A fill door finger grip 68 provides a grasping surface for overcoming the closing force of the fill door detent 66 and opening the candy fill door 62. Once the candy fill door 62 is opened, the candy pieces 26 can be inserted through the candy fill opening 60.

The dispenser shield 16 is configured to rotate about a dispenser shield rotational axis 70 between the dispensing position and the non-dispensing positions. The dispenser shield wall 18 is generally cylindrical and slightly tapered to match the inner contour of the dispenser housing 12, and surrounds the candy reservoir 22. The dispenser shield 16 further includes a dispenser shield shaft 72 that defines the dispenser shield rotational axis 70. The dispenser shield shaft 72 may be divided into an upper shaft portion 74 and a lower shaft portion 76 to facilitate assembly of the candy dispenser 10. While the dispenser shield rotational axis 70 is oriented vertically, it is contemplated to orient the rotational axis 70 horizontally or at other angles with the dispenser shield 16 being configured to rotate about the rotational axis 70 as oriented within the dispenser housing 12 and around the candy reservoir 22.

The upper shaft portion 74 may generally be a hollow cylinder having an open lower end 78 facing the lower shaft portion 76. A dispenser shield shaft top end 80 of the upper shaft portion 74 may be connected to a dispenser shield wall top edge 82 by a plurality of dispenser shield ribs 84 so that the dispenser shield wall 18, the upper shaft portion 74 and the dispenser shield ribs 84 are formed as a single unitary component. The dispenser shield ribs 84 are disposed above the candy reservoir 22 and may be circumferentially spaced about the dispenser shield shaft 72 and combine with corresponding portions of the dispenser shield wall top edge 82 to define reservoir fill openings 86 through which the candy pieces 26 can pass and be disposed within the candy reservoir 22 when the candy pieces 26 are loaded through the candy fill opening 60.

The lower shaft portion 76 is configured to connect to and engage the upper shaft portion 74 so that the lower shaft portion 76 and the dispenser shield wall 18 rotate together. The lower shaft portion 76 has an upper insertion portion 88 that is inserted into the open lower and 78 of the upper shaft portion 74 so that the shaft portions 74, 76 are concentrically aligned along the dispenser shield rotational axis 70. The shaft portions 74, 76 may include an engagement mechanism that secures the shaft portions 74, 76 for rotation together about the dispenser shield rotational axis 70. In the illustrated embodiment as best seen in FIG. 8, the engagement mechanism may include an alignment tooth 90 extending radially outward from the upper insertion portion 88 and received by a corresponding alignment notch 92 in the open lower and 78 of the upper shaft portion 74. Other engagement mechanisms are contemplated, and the engagement mechanism also ensures alignment between the lower shaft portion 76 and the dispenser shield wall 18 so that the character expression indicia 32, 34, 36 and the dispenser shield opening 20 are aligned as shown in FIGS. 3-6 when the dispenser shield 16 is stopped by the indeterminate outcome actuation mechanism as discussed further below.

Returning to FIG. 7, the lower shaft portion 76 has a plurality of shaft splines 100 extending radially outward and parallel to the dispenser shield rotational axis 70. The number of shaft splines 100 will be equal to the total number of dispensing and non-dispensing positions provided by the dispenser shield 16, i.e., four shaft splines 100 in the illustrated embodiment. The shaft splines 100 are circumferentially spaced about the lower shaft portion 76. The assembled dispenser shield 16 is mounted within the dispenser housing 12 for rotation about the dispenser shield rotational axis 70. An upper bushing 102 and an upper pivot finger 104 extend upward from the dispenser shield shaft top end 80. The upper pivot finger 104 is received in a groove of a shield mounting flange 106 of the dispenser housing 12. Once received, the upper pivot finger 104 is retained in the groove by a tab 108 of a shaft lock plate 110 that is anchored to the interior of the dispenser housing 12. A lower bushing 112 and a lower pivot finger 114 extend outward from the lower shaft portion 76, and the lower pivot finger 114 is inserted into a lower pivot finger opening 116 formed in a bottom wall 118 of the dispenser housing 12. The groove of the shield mounting flange 106 and the lower pivot finger opening 116 may be positioned to align the dispenser shield rotational axis 70 approximately coincident with a vertical longitudinal axis of the dispenser housing 12 for free rotation of the dispenser shield 16 within the dispenser housing 12.

The candy reservoir 22 is disposed within the dispenser shield wall 18 and, in the illustrated embodiment, is formed by an upper reservoir plate 120 and a lower reservoir plate 122. The upper reservoir plate 120 has a candy support surface 124 upon which the candy pieces 26 can be disposed prior to dispensing. The candy support surface 124 slopes downward from a high end proximate the rear of the dispenser housing 12 to a low end proximate the dispenser housing opening 14. A candy retention wall 126 extends upward proximate the low end of the candy support surface 124 to separate the candy pieces 26 from the interior of the dispenser shield wall 18. The candy pieces 26 are inserted through the candy fill opening 60, travel down the candy support surface 124 and accumulate behind the candy retention wall 126. Proximate the low end of the candy retention wall 126, a chute opening 128 through the candy support surface 124 and the candy retention wall 126 opens up to a chute upper portion 130 of the candy reservoir chute 24. The chute opening 128 is large enough to allow a candy piece 26 to pass there through and into the candy reservoir chute 24 when the upper lock arm 44 is not extended into the chute opening 128. The candy support surface 124 further includes a shaft opening 132 through which the dispenser shield shaft 72 extends.

The lower reservoir plate 122 is attached to a bottom surface 134 of the upper reservoir plate 120. Proximate the dispenser housing opening 14, the lower reservoir plate 122 defines a chute lower portion 136 that aligns with the chute upper portion 130 to complete the passage for the candy pieces 26 from the candy support surface 124 to the dispenser housing opening 14. The lower reservoir plate 122 also has a shaft opening 138 for the dispenser shield shaft 72.

In addition to the dispenser shield wall 18 and the dispenser shield opening 20, flow of the candy pieces 26 through the candy reservoir chute 24 is controlled by the reservoir locking mechanism 40, which is mounted on the reservoir plates 120, 122. The lower lock arm 42 is part of a lower lock lever 140 that is pivotally mounted to a lever boss 142 of the lower reservoir plate 122 by a lock lever shaft 144. The lower lock lever 140 can pivot between the position shown in FIG. 7 with the lower lock arm 42 retracted from the candy reservoir chute 24 through a lower lock aperture 146 in the lower reservoir plate 122, and the position shown in FIG. 8 where the lower lock arm 42 extends through the lower lock aperture 146 and into the candy reservoir chute 24. The lower lock lever 140 is biased toward the extended position of FIG. 8 by a lower lock arm spring 148.

The upper lock arm 44 is part of an upper lock lever 150 that is slidably mounted between the reservoir plates 122, 124. The upper lock arm 44 is disposed between the bottom surface 134 of the upper reservoir plate 120 and an upper lock guide plate 152 of the lower reservoir plate 122. The upper lock lever 150 further includes an elongated cam slot 154 that receives a lower lock lever cam arm 156 so that rotation of the lower lock lever 140 causes a corresponding sliding of the upper lock lever 150. As configured, the lower lock lever 140 causes the upper lock lever 150 to slide and retract the upper lock arm 44 from the chute opening 128 and the candy reservoir chute 24 when the lower lock lever 140 rotates to extend the lower lock arm 42 into the candy reservoir chute 24, and vice versa.

The indeterminate outcome actuation mechanism 160 of the illustrated embodiment includes the actuation button 28 with the actuation button guide shaft 54. The actuation button 28 extends through an actuation button aperture 162 of the dispenser housing 12 so that the actuation button 28 is engageable by a user of the candy dispenser 10. The actuation button guide sleeve 52 and the actuation button aperture 162 constrain the actuation button 28 to move linearly between the input device normal and actuation positions. However, alternative motions for the actuation button 28, such as circular, arcuate or other non-linear motions, are contemplated.

The position of the actuation button 28 also controls the position of the reservoir locking mechanism 40. The actuation button 28 includes an actuation button cam arm 164 extending upward and having an input device cam surface 166. The input device cam surface 166 engages a corresponding lower lock lever cam surface 168 of the lower lock lever 140. In the input device normal position of FIG. 7, the input device cam surface 166 engages the lower lock lever cam surface 168 to rotate the lower lock lever 140 counterclockwise as shown against the biasing force of the lower lock arm spring 148 so that the lower lock arm 42 is retracted in the lower lock aperture 146 and the upper lock arm 44 extends into the chute opening 128 and the candy reservoir chute 24. As the actuation button 28 is pressed inward toward the input device actuation position of FIG. 8, the input device cam surface 166 allows the lower lock arm spring 148 to rotate the lower lock lever 140 in the clockwise direction to extend the lower lock arm 42 through the lower lock aperture 146 and into the candy reservoir chute 24, and retract the upper lock arm 44 from the candy reservoir chute 24.

As mentioned above, the indeterminate outcome actuation mechanism 160 controls the actuation of the candy dispenser 10 and the movement of the dispenser shield 16. In the illustrated embodiment, the lower shaft portion 76 passes through an actuator button shaft opening 170 so that the indeterminate outcome actuation mechanism 160 can engage the shaft splines 100 to alternately secure the dispenser shield 16 in one of the dispensing and non-dispensing positions, and cause the dispenser shield 16 to rotate between the available dispensing and non-dispensing positions. For efficient usage of space within the dispenser housing 12, other elements of the indeterminate outcome actuation mechanism 160 are contained within the actuation button 28.

Figure 11:
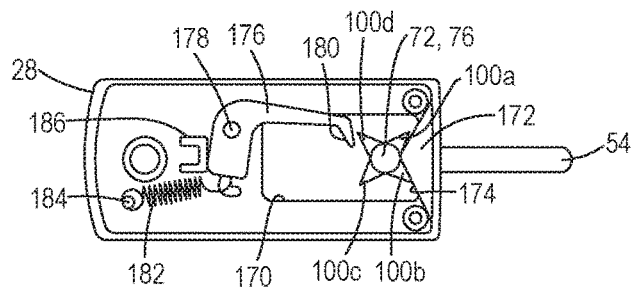
FIG. 11 is a top view of a dispenser shield shaft and an actuation button of the indeterminate outcome actuation mechanism at the input device normal position and a top wall removed to reveal additional components of the indeterminate outcome actuation mechanism.

FIG. 11 represents a top view of the actuation button 28 with a top wall removed to reveal the interior of the actuation button 28 in the input device normal position of FIG. 7. The dispenser shield 16 has one dispensing position and three non-dispensing positions, or four total positions, so the lower shaft portion 76 has four shaft splines 100a-100d so that the dispenser shield 16 can be stopped and secured at each of the discrete positions. The actuation button 28 includes a dispenser shield locking member 172 with a dispenser shield lock surface 174 configured to engage the shaft splines 100a-100d to stop and lock the dispenser shield 16 at the discrete positions. The dispenser shield lock surface 174 has a wedge shape that is complementary to the shape between adjacent ones of the shaft splines 100a-100d. As shown, the actuation button spring 50 is forcing the dispenser shield lock surface 174 into engagement between a first shaft spline 100a and a second shaft spline 100b. As seen in FIG. 7, this locked position corresponds to the dispensing position with the dispenser shield opening 20 aligned with the dispenser housing opening 14 and the candy reservoir chute 24. Engagement of the spaces between the adjacent shaft spline pairs 100b-100c, 100c-100d, 100d-100a correspond to aligning the dispenser shield 16 at the non-dispensing positions of FIGS. 3-5.

The indeterminate outcome actuation mechanism 160 also includes a dispenser shield drive member 176 pivotally connected to the actuation button 28 by a drive member shaft 178. The dispenser shield drive member 176 includes a shaft rotation finger 180 configured to engage the shaft splines 100a-100d to rotate the lower shaft portion 76 and, correspondingly, the dispenser shield 16 in both directions depending on the position of the actuation button 28 and the direction of its motion. A drive member spring 182 is attached between the dispenser shield drive member 176 and an anchor shaft 184, and biases the dispenser shield drive member 176 to place the shaft rotation finger 180 within the actuator button shaft opening 170 and in position to engage the shaft splines 100a-100d. A drive member stop 186 limits the rotation of the dispenser shield drive member 176 to place the shaft rotation finger 180 in the appropriate location within the actuator button shaft opening 170.

FIGS. 7 and 11 combine to show the state of the candy dispenser 10 after a previous actuation. The actuation resulted in the dispenser shield 16 stopping at the dispensing position and the dispenser shield opening 20 aligning to dispense a candy piece 26 from the candy reservoir chute 24 past the retracted lower lock arm 42 and through the dispenser housing opening 14. Consequently, the candy reservoir chute 24 is empty and the extended upper lock arm 44 prevents the next candy piece 26 from dropping into the candy reservoir chute 24.

Figure 12:
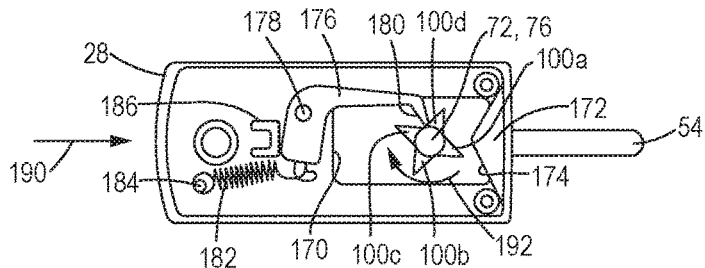
FIG. 12 is the top view of the dispenser shield shaft and actuation button of FIG. 11 with the actuation button at a first intermediate position moving from the input device normal position to the input device actuation position.
Figure 13:
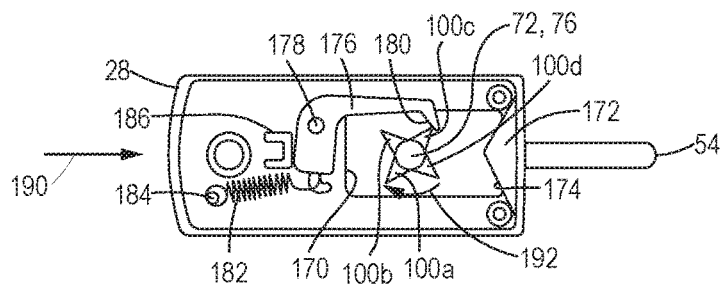
FIG. 13 is the top view of the dispenser shield shaft and actuation button of FIG. 11 with the actuation button at a second intermediate position moving from the input device normal position to the input device actuation position.
Figure 14:
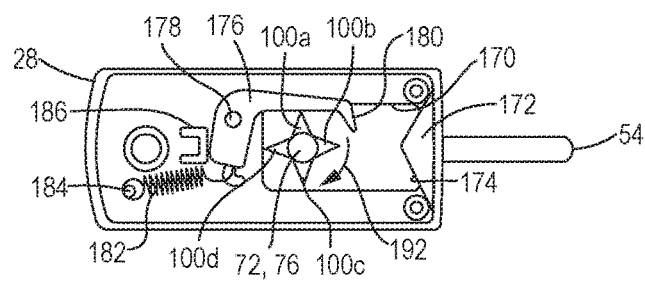
FIG. 14 is the top view of the dispenser shield shaft and actuation button of FIG. 11 with the actuation button at the input device actuation position.

The sequence of the actuation button 28 displacing from the input device normal position of FIG. 7 to the input device actuation position of FIG. 8 is illustrated in FIGS. 12-14. A force applied by a user to displace the actuation button 28 and a direction of movement are indicated by an arrow 190. As the actuation button 28 displaces, the dispenser shield lock surface 174 disengages from the shaft splines 100a, 100b, thereby allowing the dispenser shield shaft 72 and the dispenser shield 16 to rotate about the dispenser shield rotational axis 70. At a first intermediate position shown in FIG. 12, the shaft rotation finger 180 is engaging the fourth shaft spline 100d to cause the dispenser shield shaft 72 to rotate clockwise as indicated by an arrow 192. At a second intermediate position of the actuation button 28 shown in FIG. 13, the shaft rotation finger 180 is past the point of driving the shaft splines 100a-100d. However, the shaft rotation finger 180 is still in position to be engaged by the shaft splines 100a-100d as they rotate past. The drive member spring 182 allows the dispenser shield drive member 176 to rotate counterclockwise to permit the dispenser shield shaft 72 to continue rotating while applying the retarding force to slow the rotation. At the input device actuation position shown in FIGS. 8 and 14, the shaft rotation finger 180 may be clear of the shaft splines 100a-100d, but the shaft splines 100a-100d may still impact the dispenser shield drive member 176 to slow and eventually stop the rotation of the dispenser shield 16.

FIG. 8 illustrates the state of the candy dispenser 10 within the dispenser housing 12 as the dispenser shield 16 is actuated and rotating. As the actuation button 28 moved toward the input device actuation position, the input device cam surface 166 moved downward relative to the lower lock lever cam surface 168 to allow the lower lock lever 140 to rotate clockwise under the biasing force of the lower lock arm spring 148. During the rotation, the lower lock lever cam arm 156 caused the upper lock lever 150 to slide rearward and retract the upper lock arm 44 to allow the next candy piece 26 to drop into the candy reservoir chute 24. The candy piece 26 is retained in the candy reservoir chute 24 by the lower lock arm 42 that extended as the lower lock lever 140 rotated. As the dispenser shield 16 continues to rotate about the dispenser shield rotational axis 70, the lower lock arm 42 will prevent the candy piece 26 from falling out of the dispenser housing opening 14 when the dispenser shield opening 20 rotates past and aligns with the candy reservoir chute 24.

Figure 9:
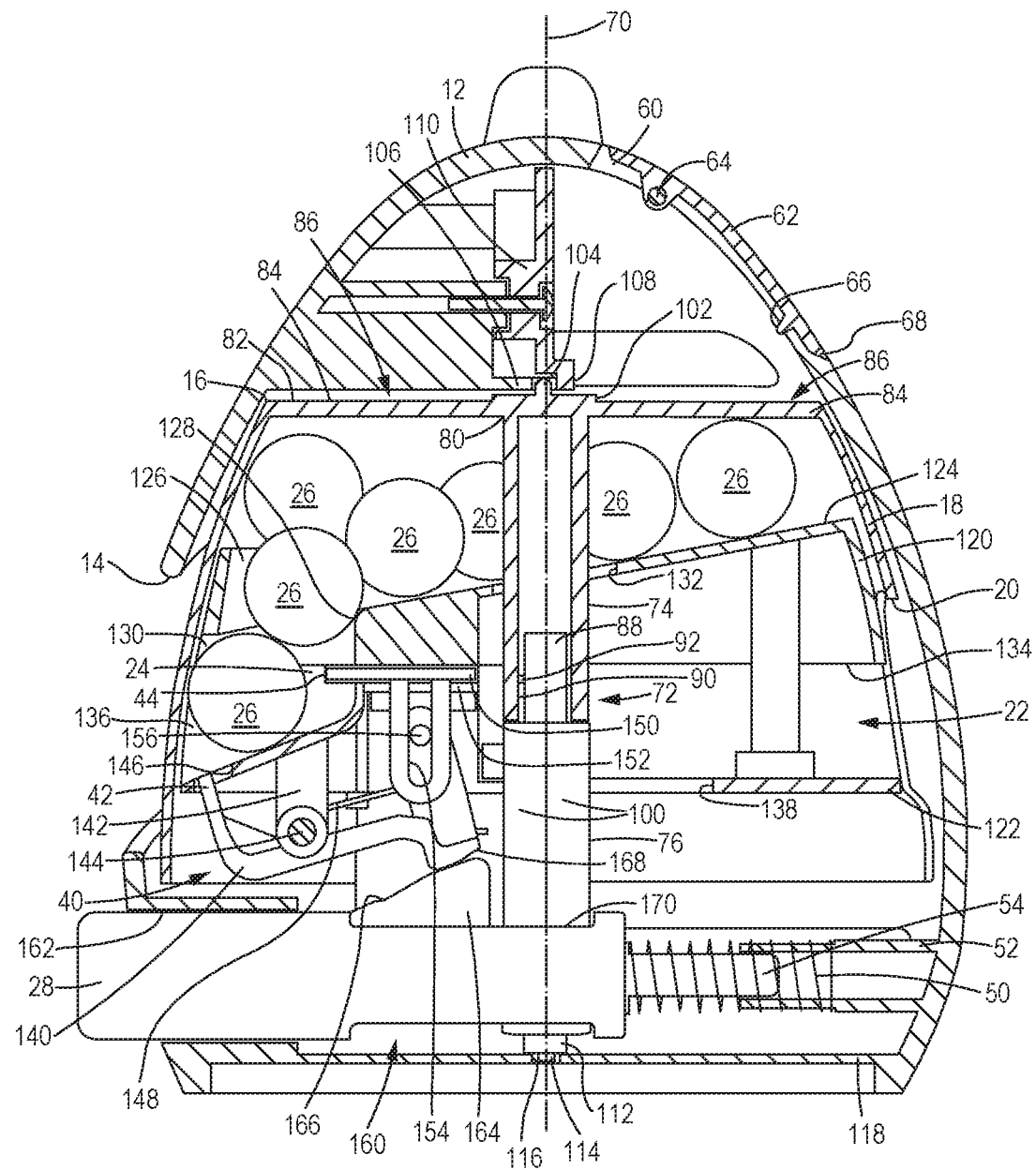
FIG. 9 is the side cross-sectional view of the candy dispenser of FIG. 7 with the indeterminate outcome actuation mechanism in the input device normal position and the dispenser shield in the second non-dispensing position.
Figure 15:
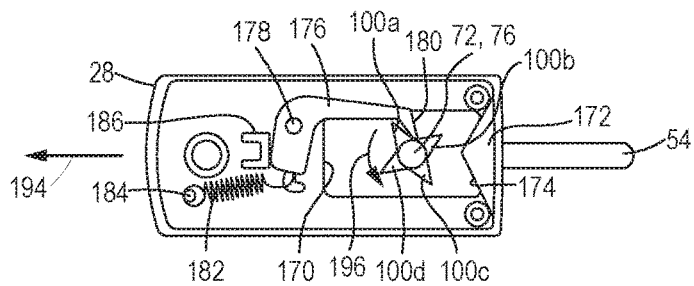
FIG. 15 is the top view of the dispenser shield shaft and actuation button of FIG. 11 with the actuation button at an intermediate position moving from the input device actuation position to the input device normal position.

Either after the dispenser shield 16 stops rotating, or while the dispenser shield 16 is still rotating, the user will release the actuation button 28 and allow the actuation button spring 50 to force the actuation button 28 back toward the input device normal position shown in FIG. 9. FIG. 15 illustrates the actuation button 28 traveling through an intermediate position as the actuation button spring 50 drives the actuation button 28 from the input device actuation position back to the input device normal position. The direction of the spring force and the motion of the actuation button 28 are indicated by an arrow 194. In the illustrated position, the shaft rotation finger 180 engages the shaft spline 100a to stop the clockwise rotation of the dispenser shield shaft 72 and the dispenser shield 16. As the actuation button 28 continues to move toward the input device normal position, the shaft rotation finger 180 will cause the dispenser shield shaft 72 to rotate back in the counterclockwise direction as indicated by an arrow 196. The counterclockwise rotation ultimately aligns the dispenser shield shaft 72 so that the dispenser shield lock surface 174 enters the space between the adjacent shaft splines 100*c*, 100*d* to stop the dispenser shield 16 at the second non-dispensing position as shown in FIG. 9.

Figure 10:
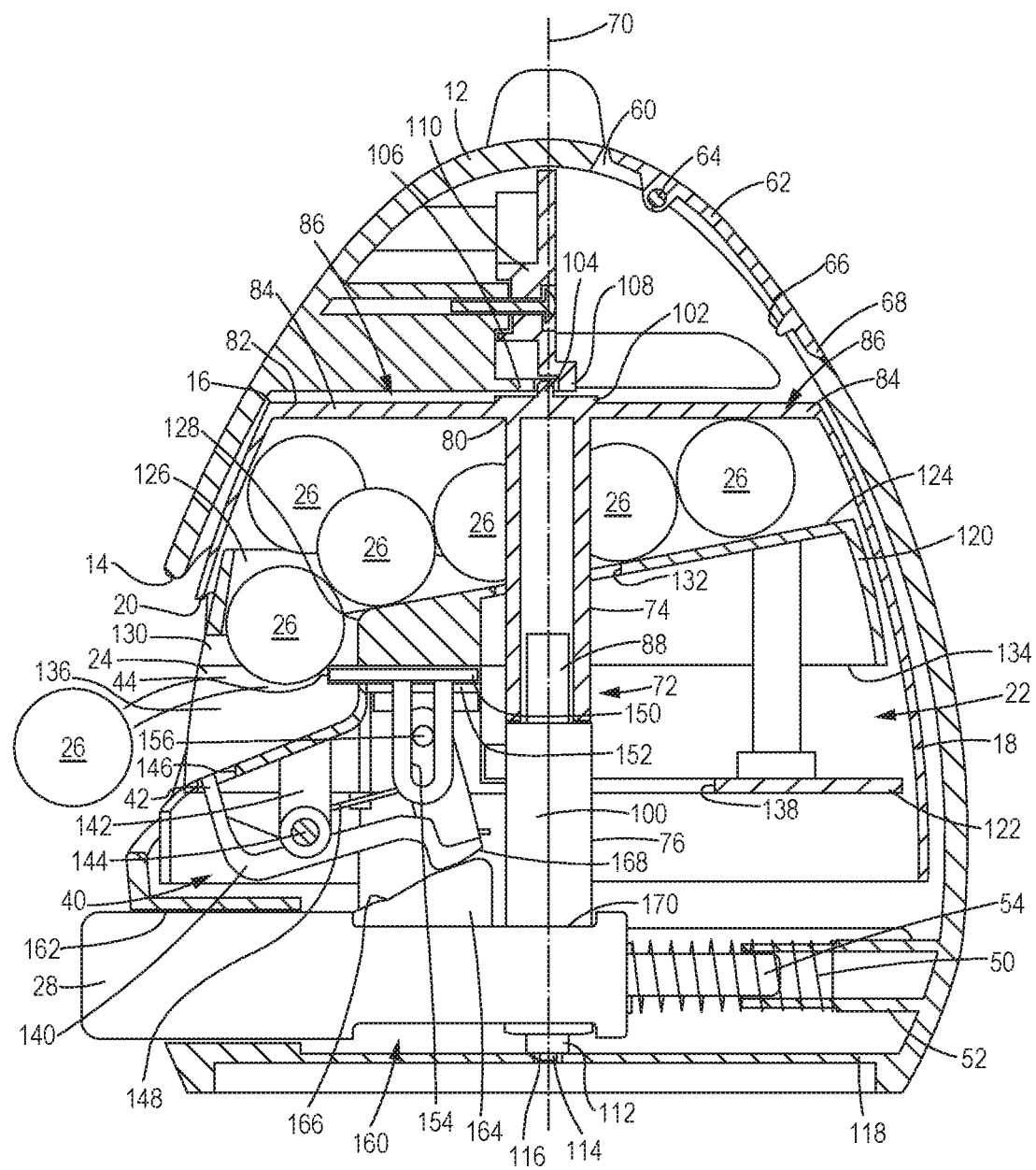
FIG. 10 is the side cross-sectional view of the candy dispenser of FIG. 7 with the indeterminate outcome actuation mechanism in the input device normal position, the dispenser shield in the second non-dispensing position, and a candy piece being dispensed from the candy dispenser.

FIG. 9 is similar to FIG. 7, but with the dispenser shield wall 18 covering the candy reservoir chute 24. As the actuation button 28 moved back to the input device normal position, the input device cam surface 166 engaged the lower lock lever cam surface 168 to rotate the lower lock lever 140 counterclockwise and retract to the lower lock arm 42 while extending the upper lock arm 44. The dispenser shield wall 18 prevents the candy piece 26 in the candy reservoir chute 24 from being dispensed through the dispenser housing opening 14. When the candy dispenser 10 is actuated again by a user, the reservoir locking mechanism 40 will return to the position shown in FIG. 8 to retain the candy piece 26 and the candy reservoir chute 24 while the dispenser shield opening 20 rotates past the candy reservoir chute 24 as described above. When a subsequent actuation of the indeterminate outcome actuation mechanism 160 results in the dispenser shield lock surface 174 engaging the shaft splines 100*a*, 100*b* as shown in FIG. 11 and the dispenser shield 16 stopping at the dispensing position as shown in FIG. 10, the dispenser shield opening 20 aligns with the candy reservoir chute 24 to allow the candy piece 26 in the candy reservoir chute 24 to be dispensed through the dispenser housing opening 14, which is possible because the lower lock arm 42 is retracted. The upper lock arm 44 is extended into the chute opening 128 to prevent the remaining candy pieces 26 in the candy reservoir 22 from dropping into the candy reservoir chute 24 and being dispensed from the candy dispenser 10.

Figure 16:
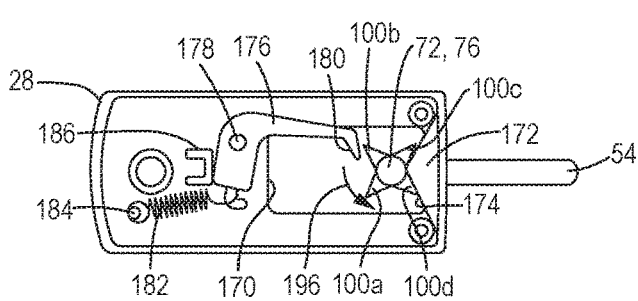
FIG. 16 is the top view of the dispenser shield shaft and actuation button of FIG. 11 with the actuation button at the input device normal position and a user attempting to rotate the dispenser shield in the counterclockwise direction.

As configured, the indeterminate outcome actuation mechanism 160 may prevent a user from manually rotating the dispenser shield 16 in at least one direction when the actuation button 28 is disposed in the input device normal position. FIG. 16 illustrates the actuation button 28 and associated components in the input device normal position with the dispenser shield lock surface 174 engaging the shaft splines 100*c*, 100*d* to lock the dispenser shield 16 in the second non-dispensing position. If a user attempts to rotate the dispenser shield 16 and the dispenser shield shaft 72 in the counterclockwise direction indicated by the arrow 196, perhaps in an attempt to rotate the dispenser shield 16 to the dispensing position, the shaft spline 100*b* will be engaged by the shaft rotation finger 180 while the shaft spline 100*d* is engaged by the dispenser shield lock surface 174 to substantially prevent further counterclockwise rotation of the dispenser shield 16.

INDUSTRIAL APPLICABILITY

The indeterminate outcome actuation mechanism 160 in accordance with the present disclosure offers uncertainty to the user each time the candy dispenser 10 is actuated as to whether a candy piece 26 will be dispensed. In the illustrated embodiment, one of the four positions of the dispenser shield 16 will result in a candy piece 26 being dispensed. The outcome may not be purely random, but it may offer the user a measure of anticipation as to whether a candy piece 26 will be dispensed with each actuation. The ultimate outcome of the actuation will be affected by various factors. For instance, the amount of displacement of the actuation button 28 will determine how much influence the shaft rotation finger 180 and the remainder of the dispenser shield drive member 176 have on retarding the rotation of the dispenser shield shaft 72. The amount of force applied to and the corresponding displacement speed of the actuation button 28 will affect the initial rotational velocity of the dispenser shield 16. The initial position of the dispenser shield 16 will also have an effect on the final position when the dispenser shield lock surface 174 engages the shaft splines 100*a*-100*d*. Factors like these may also lead the user to experiment with varying the manner in which they actuate the candy dispenser 10 to see if they can influence the outcome.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A confectionary item dispenser comprising:
a dispenser housing having a dispenser housing opening;
a reservoir for holding confectionary items disposed within the dispenser sine and having a reservoir chute aligned with the dispenser housing opening;
a dispenser shield disposed between the dispenser housing and the reservoir, the dispenser shield having a dispenser shield wall with a dispenser shield opening there through, wherein the dispenser shield is movable between a dispensing position where the dispenser shield opening is aligned with the dispenser housing opening and the reservoir chute so that a confectionary item disposed within the reservoir chute can be dispensed through the dispenser shield opening and the dispenser housing opening, and a non-dispensing position where the reservoir chute is covered by the dispenser shield wall to retain the confectionary item within the reservoir chute; and
an indeterminate outcome actuation mechanism disposed within the dispenser housing and operatively connected to the dispenser shield, the indeterminate outcome actuation mechanism comprising an actuation mechanism input device engageable by a user of the confectionary item dispenser, wherein the indeterminate outcome actuation mechanism engages the dispenser shield to cause the dispenser shield to move between the dispensing position and the non-dispensing position when the actuation mechanism input device is displaced from an input device normal position toward an input device actuation position so that the dispenser shield may be disposed in either one of the dispensing position and the non-dispensing position when the actuation mechanism input device is displaced back to the input device normal position.

2. The confectionary item dispenser of claim 1, comprising an upper lock arm operatively connected to the actuation mechanism input device such that the upper lock arm extends to prevent the confectionary items from entering the reservoir chute when the actuation mechanism input device is in the input device normal position and retracts to allow the confectionary items to enter the reservoir chute when the actuation mechanism input device is displaced toward the input device actuation position.

3. The confectionary item dispenser of claim 2, wherein the upper lock arm is mounted within the dispenser housing to move linearly between an upper lock arm extended position and an upper lock arm retracted position.

4. The confectionary item dispenser of claim 1, comprising a lower lock arm operatively connected to the actuation mechanism input device such that the lower lock arm retracts to allow the confectionary item in the reservoir chute to be dispensed from the reservoir chute when the actuation mechanism input device is in the input device normal position and extends into the reservoir chute to prevent the confectionary item therein from dispensing when the actuation mechanism input device is displaced toward the input device actuation position.

5. The confectionary item dispenser of claim 4, wherein the lower lock arm is mounted within the dispenser housing to rotate between a lower lock arm extended position and a lower lock arm retracted position.

6. The confectionary item dispenser of claim 1, wherein the dispenser shield wall surrounds the reservoir, and wherein the dispenser shield comprises a dispenser shield shaft operatively connected to the dispenser shield wall and defining a dispenser shield rotational axis about which the dispenser shield rotates, and wherein the indeterminate outcome actuation mechanism engages the dispenser shield shaft to cause rotation of the dispenser shield when the actuation mechanism input device is displaced from the input device normal position toward the input device actuation position.

7. The confectionary item dispenser of claim 6, wherein the dispenser shield comprises a plurality of dispenser shield ribs connecting a dispenser shield shaft top end to a dispenser shield wall top edge, and wherein the plurality of dispenser shield ribs are disposed above the reservoir and circumferentially spaced about the dispenser shield shaft to define reservoir fill openings (86) there between through which the confectionary items can pass to be disposed within the reservoir.

8. The confectionary item dispenser of claim 6, wherein the dispenser shield shaft comprises a plurality of shaft splines extending radially outward from the dispenser shield shaft and parallel to the dispenser shield rotational axis, wherein a number of the plurality of shaft splines is equal to a total number of the dispensing position and the non-dispensing position of the dispenser shield, wherein the indeterminate outcome actuation mechanism engages at least one of the plurality of shaft splines when the actuation mechanism input device is displaced toward the input device actuation position to rotate the dispenser shield, and engages at least one of the plurality of shaft splines when the actuation mechanism input device is in the input device normal position to stop the dispenser shield at the dispensing position or the non-dispensing position.

9. The confectionary item dispenser of claim 8, wherein the indeterminate outcome actuation mechanism comprises a shaft rotation finger operatively connected to the actuation mechanism input device, wherein the shaft rotation finger engages one of the plurality of shaft splines when the actuation mechanism input device is displaced toward the input device actuation position to cause the dispenser shield to rotate.

10. The confectionary item dispenser of claim 9, wherein the shaft rotation finger engages one of the plurality of shaft splines when the actuation mechanism input device is displaced back to the input device normal position to cause one of the dispensing position and the non-dispensing position of the dispenser shield to align with the reservoir chute and the dispenser housing opening.

11. The confectionary item dispenser of claim 9, wherein the indeterminate outcome actuation mechanism comprises a dispenser shield lock surface that engages the dispenser shield shaft between adjacent shaft splines to align one of the dispensing position and the non-dispensing position of the dispenser shield with the reservoir chute and the dispenser housing opening.

12. An indeterminate outcome actuation mechanism for a confectionary item dispenser having a dispenser housing with a dispenser housing opening, a reservoir disposed within the dispenser housing and having a reservoir chute aligned with the dispenser housing opening, and a dispenser shield between the dispenser housing and the reservoir, the dispenser shield having a dispenser shield wall with a dispenser shield opening there through, and being movable between a dispensing position where the dispenser shield opening is aligned with the dispenser housing opening and the reservoir chute and a non-dispensing position where the reservoir chute is covered by the dispenser shield wall, the indeterminate outcome actuation mechanism comprising:
  an actuation mechanism input device engageable by a user of the confectionary item dispenser and having an input device normal position and an input device actuation position; and
  a dispenser shield drive member engaging the dispenser shield when the actuation mechanism input device is displaced from the input device normal position toward the input device actuation position to cause the dispenser shield to move between the dispensing position and the non-dispensing position, wherein the dispenser shield drive member allows the dispenser shield to move each instance of the actuation mechanism input device being displaced from the input device normal position to the input device actuation position so that the dispenser shield may be disposed in either one of the dispensing position and the non-dispensing position when the actuation mechanism input device is displaced back to the input device normal position.

13. The indeterminate outcome actuation mechanism of claim 12, wherein the dispenser shield wall surrounds the reservoir and the dispenser shield includes a dispenser shield shaft operatively connected the dispenser shield wall and defining a dispenser shield rotational axis about which the dispenser shield rotates, and wherein the dispenser shield drive member engages the dispenser shield shaft to cause rotation of the dispenser shield when the actuation mechanism input device is displaced from the input device normal position toward the input device actuation position.

14. The indeterminate outcome actuation mechanism of claim 13 comprising a dispenser shield locking member that engages the dispenser shield to prevent movement of the dispenser shield when the actuation mechanism input device is in the input device normal position, and disengages the dispenser shield to allow movement of the dispenser shield when the actuation mechanism input device is displaced toward the input device actuation position.

15. The indeterminate outcome actuation mechanism of claim 14, wherein the dispenser shield shaft has a plurality of shaft splines extending radially outward from the dispenser shield shaft and parallel to the dispenser shield rotational axis, wherein a number of the plurality of shaft splines is equal to a total number of the dispensing position and the non-dispensing position of the dispenser shield, wherein the dispenser shield drive member engages at least one of the plurality of shaft splines when the actuation mechanism input device is displaced toward the input device actuation position to rotate the dispenser shield, and the dispenser shield locking member engages at least one of the plurality of shaft splines when the actuation mechanism input device is in the input device normal position to stop the dispenser shield at one of the dispensing position and the non-dispensing position.

16. The indeterminate outcome actuation mechanism of claim 15, wherein the dispenser shield drive member comprises a shaft rotation finger operatively connected to the actuation mechanism input device, wherein the shaft rotation finger engages at least one of the plurality of shaft splines when the actuation mechanism input device is displaced toward the input device actuation position to cause the dispenser shield to rotate.

17. The indeterminate outcome actuation mechanism of claim 16, wherein the shaft rotation finger engages at least one of the plurality of shaft splines when the actuation mechanism input device is displaced back to the input device normal position to cause one of the dispensing position and the non-dispensing position of the dispenser shield to align with the reservoir chute and the dispenser housing opening.

18. A confectionary item dispenser comprising:
a dispenser housing having a dispenser housing opening;
a reservoir for holding confectionary items disposed within the dispenser housing and having a reservoir chute aligned with the dispenser housing opening;
a dispenser shield disposed between the dispenser housing and the reservoir, the dispenser shield having a dispenser shield wall with a dispenser shield opening there through, wherein the dispenser shield is movable between a dispensing position where the dispenser shield opening is aligned with the dispenser housing opening and the reservoir chute so that a confectionary item disposed within the reservoir chute can be dispensed through the dispenser shield opening and the dispenser housing opening, and a non-dispensing position where the reservoir chute is covered by the dispenser shield wall to retain the confectionary item within the reservoir chute;
an indeterminate outcome actuation mechanism disposed within the dispenser housing and operatively connected to the dispenser shield, the indeterminate outcome actuation mechanism comprising an actuation mechanism input device engageable by a user of the confectionary item dispenser, wherein the indeterminate outcome actuation mechanism engages the dispenser shield to cause the dispenser shield to move between the dispensing position and the non-dispensing position when the actuation mechanism input device is displaced from an input device normal position toward an input device actuation position so that the dispenser shield may be disposed in either one of the dispensing position and the non-dispensing position when the actuation mechanism input device is displaced back to the input device normal position;
an upper lock arm operatively connected to the actuation mechanism input device; and
a lower lock arm operatively connected to the actuation mechanism input device,
wherein the upper lock arm extends to prevent the confectionary items from entering the reservoir chute and the lower lock arm retracts to allow the confectionary item in the reservoir chute to be dispensed from the reservoir chute when the actuation mechanism input device is in the input device normal position, and
wherein the upper lock arm retracts to allow the confectionary items to enter the reservoir chute and the lower lock arm extends into the reservoir chute to prevent the confectionary item therein from dispensing when the actuation mechanism input device is displaced toward the input device actuation position.

19. The confectionary item dispenser of claim 18, wherein the upper lock arm is mounted within the dispenser housing to move linearly between an upper lock arm extended position and an upper lock arm retracted position, and the lower lock arm is mounted within the dispenser housing to rotate between a lower lock arm extended position and a lower lock arm retracted position.

20. The confectionary item dispenser of claim 19, wherein the upper lock arm comprises a cam slot and the lower lock arm comprises a cam arm disposed within the cam slot, and wherein displacement of the actuation mechanism input device causes the lower lock arm to rotate from the lower lock arm retracted position toward the lower lock arm extended position and engagement of the cam arm within the cam slot causes the upper lock arm to move from the upper lock arm extended position toward the upper lock arm retracted position when the actuation mechanism input device is displaced toward the input device actuation position.

* * * * *